(No Model.)
J. McBRIDE.
Holder and Pulverizer for Sugar, Salt, &c.
No. 243,385. Patented June 28, 1881.
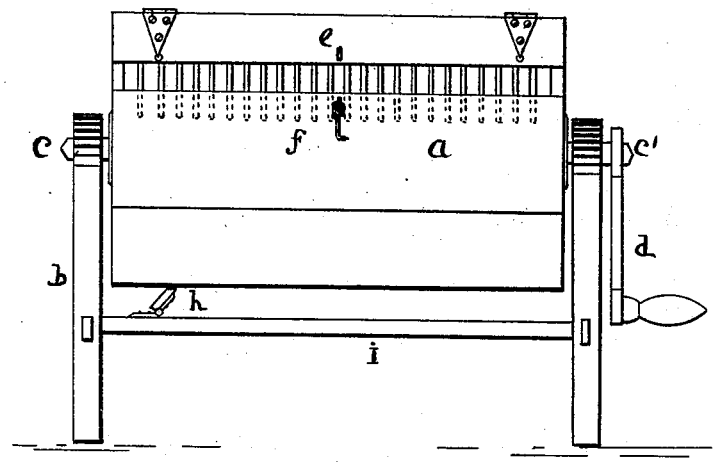
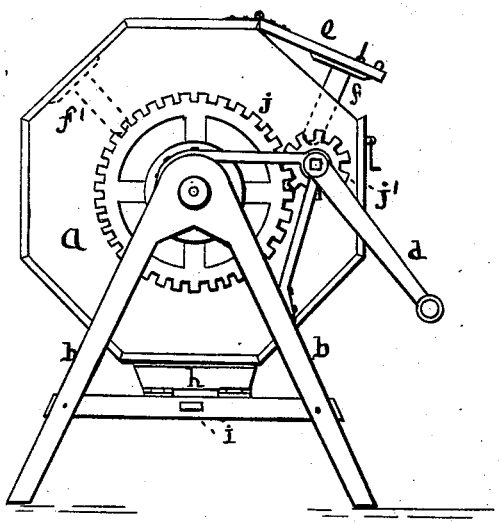

United States Patent Office.

JAMES McBRIDE, OF ITHACA, NEW YORK.

HOLDER AND PULVERIZER FOR SUGAR, SALT, &c.

SPECIFICATION forming part of Letters Patent No. 243,385, dated June 28, 1881.

Application filed May 16, 1881. (No model.)

*To all whom it may concern:*

Be it known that I, JAMES MCBRIDE, of Ithaca, New York, a citizen of the United States, have invented an Improved Sugar Pulverizer and Holder and Mixer for Feed and other Articles, of which the following is a specification.

My object is to pulverize and mix sugar, salt, and other articles, and to hold them in a suitable vessel, which shall exhibit them in a pulverized, livened-up state for sale. As a feed-mixer, my device mixes and holds the feed until used. For this purpose I make an oblong cylindrical vessel, preferably octagonal in shape, with one or more of its sides removable, or hinged as a lid, and with one or more rows of teeth on its inside, against which and the octagonal sides the lumps that the changes of the atmosphere, the packing in the original casks, or other causes have produced are thrown and crushed, and the whole mixed; or in the said vessel various qualities or substances are mixed together.

Figure 1 is a side elevation of my device. Fig. 2 is an end view of the same; and Fig. 3 is an inside view of the lid, showing the arrangement of the rows of teeth.

In the figures, $a$ is the octagonal cylinder, supported on the frame $b$ by shaft-journals $c$, and turned by the crank $d$, applied, as in Fig. 1, to the end of one of the journals $c$, or, as seen in Fig. 2, to the pinion-shaft $j'$ of the cog-wheel $j$. One of the sides, $e$, is hinged and opens as a lid, and to it is fixed series of teeth $f$, which extend into the cavity of the cylinder. All internal parts are made preferably of wood. The teeth are for the purpose of crushing the lumps of the article contained in the cylinder and mixing them, when the cylinder is revolved, as is apparent will be the case by the rapid action when the crank is on the shaft $c$, in mixing lighter articles, as well as crushing the heavier articles by their fall on them when a slower revolution is had by the cog-wheels.

To use my machine, I put a barrel of sugar or like article into the opened lid, then shut the lid, and revolve the cylinder. Its capacity being greater than its contents, the mixing or crushing takes place by the rotation and falling on the teeth and against the octagonal sides; and it livens up and whitens sugar.

My design is to have a separate cylinder and frame for each quality of sugar, and when neatly made they are not ill-appearing holders of the sugar, the lid opening readily and displaying the sugar in the described pulverized and livened-up state to be lifted out and weighed.

As a feed-mixer, the machine is placed in a barn or other suitable place, and the cut hay, straw, and ground grain or other articles mixed together and used out of it.

To fix the cylinder in the best position for retailing, there is beneath the cylinder a hinged stop, $h$, on the cross-bar $i$ of the frame $b$, which is turned down when the cylinder is to be revolved, and up when the lid is to be held upward.

Salt, as well as sugar, is an article that the daily changes of the atmosphere tend to make lumpy. The turning of the cylinder every morning as the selling commences corrects this lumpiness and enables the seller the better to display and sell his goods.

The joints of the lid are, if necessary, tightened with cloth, rubber, or other elastic substance, so that the contents shall not sift out as the cylinder revolves, and the lid is not only hinged, but clasped fast when the revolution takes place.

The rows of teeth $f$ on the lid $e$ are arranged as seen in Fig. 3. The upper row has an angle at the middle of the lid, into which the article falls as revolution takes place, and graduates the fall and makes the pulverization more complete. A second row of teeth, $f''$, is just below the first row, and has an open space in its center. Other teeth, $f'$, may be used on other sides of the cylinder, if desirable; but if so it is requisite that they shall be on the upper side of the cylinder, as shown in Fig. 1, that the teeth may be out of the way of the scoop in selling, as well as to give a falling space on the teeth as rotation takes place.

I claim—

1. The rotating cylinder $a$, with teeth $f$ for crushing and mixing salt, sugar, and other articles, supported by the frame $b$, and adapted to and constructed for holding and selling said articles, as shown and set forth.

2. The combination of the cylinder $a$, lid $e$, angular row or rows of teeth $f$, frame $b$, journals and shaft $c$, and crank $d$, constructed and operating as set forth.

3. The combination of the cylinder $a$, frame $b$, teeth $f f'$, lid $e$, shaft with journals $c$, cog-wheels $j j'$, and stop $h$, constructed and arranged and used as set forth.

JAMES McBRIDE.

Witnesses:
S. J. PARKER,
J. C. KING.